United States Patent [19]
Siemens et al.

[11] 3,929,468
[45] Dec. 30, 1975

[54] PROCESS FOR RECOVERY OF NON-FERROUS METALS FROM OXIDE ORES AND CONCENTRATES

[75] Inventors: Richard E. Siemens; Philip C. Good, both of Albany, Oreg.

[73] Assignee: The United States of America as represented by the Secretary of the Interior, Washington, D.C.

[22] Filed: Jan. 2, 1975

[21] Appl. No.: 538,227

[52] U.S. Cl. .................. 75/103; 75/82; 75/101 BE; 75/117; 75/119; 75/121; 423/33; 423/49; 423/139; 423/150; 204/112
[51] Int. Cl.² .................... C22B 23/04; C22B 15/10
[58] Field of Search ....... 75/103, 119, 101 BE, 117, 75/82

[56] References Cited
UNITED STATES PATENTS

| | | | |
|---|---|---|---|
| 2,850,376 | 9/1958 | Queneau et al. | 75/82 |
| 2,998,311 | 8/1961 | Illis et al. | 75/82 |
| 3,141,765 | 7/1964 | Brown et al. | 75/103 |
| 3,146,091 | 8/1964 | Green | 75/82 |
| 3,276,863 | 10/1966 | Drobnick | 75/108 |
| 3,761,250 | 9/1973 | Weir et al. | 75/103 X |
| 3,767,762 | 10/1973 | Kunda | 423/145 |
| 3,816,098 | 6/1974 | Mackin et al. | 75/119 X |

*Primary Examiner*—G. Ozaki
*Attorney, Agent, or Firm*—Roland H. Shubert; Donald R. Fraser

[57] ABSTRACT

Nickel, cobalt and copper are recovered from oxide ores and oxide ore concentrates, especially those ores and concentrates containing substantial amounts of iron oxides, by selectively reducing the non-ferrous metal oxides to their elemental state in the absence of water vapor at temperatures ranging from 350°C to 600°C using carbon monoxide as the sole reductant. The reduced ore is then cooled and subjected to an oxidizing leach using an aqueous ammonia-ammonium sulfate solution as the leaching medium. Leaching is controlled in such a fashion that the non-ferrous metals are oxidized and stabilized in solution as their ammine complexes prior to the occurrence of any substantial oxidation of ferrous iron to the ferric state. Non-ferrous metal values are then separately recovered from the leach solution by techniques such as solvent extraction and precipitation. The process allows recovery of more than 90% of the nickel and more than 85% of the cobalt from laterite ores.

39 Claims, 10 Drawing Figures

PROCESS FOR RECOVERY OF NON-FERROUS METALS FROM OXIDE ORES AND CONCENTRATES

BACKGROUND OF THE INVENTION

The extractive metallurgy of the oxide ores of non-ferrous metals, such as nickel, cobalt and copper, present problems not normally encountered with other ores, such as the sulfides, of those same metals. It is diffucult and often impossible to beneficiate such ores by the usual mineral dressing techniques because the desired metal is so intimately dispersed throughout the ore. Consequently, it is usual practice to subject the entire ore mass to pyrometallurgical or hydrometallurgical processes or combinations of the two.

This is especially true of the oxide ores of nickel and cobalt which commonly are referred to as lateritic ores. For the purposes of this disclosure, no distinction is made between the limonite type and the silicate type of lateritic ore since both types are usually present in the same deposit and, from a mineralogical point of view, the distinction between the two types is one of degree. In current commercial practice, pyrometallurgical techniques employed require the melting in electric furnaces of the entire ore mass and reduction of the nickel along with substantial amounts of iron present in the ore to the elemental metals using such reductants as ferrosilicon. Examples of such techniques are those of Le Nickel and Hanna Nickel Smelting Company. The first is described in an article by Thurneyssen et al, entitled "Ferro-nickel Smelting in New Caledonia", published in the *Journal of Metals*, V. 12, March 1960, pp. 202–205 while the second process is described in a paper by Coleman et al entitled "Ferro-nickel Production in Oregon", also published in the *Journal of Metals*, V. 12, March 1960, pp. 197–201. These processes are economically restricted to relatively high grade, low iron, silicate ores because of the large quantity of electrical energy required.

Hydrometallurgical processes used commercially include those utilizing a high temperature, high pressure sulfuric acid leach. This teachnique is restricted to low magnesia, limonitic type ores in order to avoid excessive acid consumption. However, it does offer the advantage of recovering some 90% or more of both nickel and cobalt contained in the ore.

There are a variety of closely related processes employing a combination of pyrometallurgical and hydrometallurgical techniques. These processes have in common the general steps of reducing nickel and cobalt contained in the ore to the metallic state followed by an oxidative, ammonia, or ammonium salt leach. The reduction step is carried out in the solid state using a variety of gaseous, liquid and solid reductants including hydrogen, carbon monoxide, liquid hydrocarbons and coal or coke. In all instances, efforts are made to perform a selective reduction with the object of attaining as complete as possible reduction of nickel, cobalt and copper, if present, to the metallic state while limiting the amount of iron so reduced. Leaching of the reduced ore is usually accomplished with an ammonia-ammonium carbonate solution into which oxygen or air is sparged. Purpose of the oxygen is to oxidize the elemental metals contained in the reduced ore and the metals then go into solution as ammonium complexes. Since iron does not form a soluble ammonium complex, it is oxidized to a hydrous ferric oxide which precipitates during the leaching process. Thus there is obtained a pregnant ammonium leach liquor containing nickel in solution accompanied by cobalt, usually in significantly smaller amount, and copper if those elements are present in the ore.

Leach solutions carrying metal values can be treated in a variety of ways to recover the contained metals. For example, nickel is conventionally recovered from an ammonia-ammonium carbonate leach solution simply by boiling the solution to drive off ammonia and carbon dioxide. This precipitates the dissolved nickel as a basic nickel carbonate which then can be calcined to yield a nickel oxide product. Cobalt may be precipitated as the sulfide by treatment of a leach solution with hydrogen sulfide. Also, there are known a variety of solvent extraction techniques to selectively recover one or more of the metals contained in the leach solution.

A comprehensive treatment of nickel metallurgy and a description of the major processes in commercial use will be found in a book by Boldt et al, *The Winning of Nickel*, D. Van Nostrand Co., Inc., Princeton, New Jersey, 1967. Representative U.S. patents illustrating the state of the art in selective reduction of lateritic ores, leaching techniques and solvent extraction methods include the following: U.S. Pat. Nos. 2,850,376; 2,998,311; 3,141,765; 3,146,091 and 3,276,863.

SUMMARY OF THE INVENTION

We have discovered that the iron-containing oxide ores of the non-ferrous metals, including nickel, cobalt and copper, may be selectively reduced by careful control of the reducing atmosphere and reduction temperature to yield the metals in a highly active elemental form which then may be substantially completely recovered by means of an oxidizing, ammonia-ammonium sulfate leach. Specifically, we have found that ores such as laterites may be reacted using carbon monoxide as the sole reductant at temperatures ranging from about 350° to 600°C to achieve a reduction of more than 95% of the nickel and cobalt content to the elemental metal while limiting the reduction of iron to levels of 10 to 15% or even less.

The ore must be dried prior to reduction with all free moisture and limonitic water driven off. Limonitic water is herein defined as that water associated with iron oxides in an adsorbed or hydrate form, or both, which is removable by heating to a temperature on the order of 350° to 400°C. Water vapor, if present in the reduction stage, decreases the selectivity of the reduction and prevents direct regeneration of the reducing gas stream. Chemically bound water, associated with silicates contained in the ore, is unaffected by either the drying step or the reduction.

Leaching of the reduced ore is accomplished in a controlled fashion so that essentially all of the nickel, cobalt and copper values are dissolved and stabilized as their ammonium complexes before iron is allowed to oxidize to the ferric state. This prevents precipitation of gelatinous ferric hydroxide, or hydrated ferric oxides, upon the ore particles thus enhancing the recovery of metal values in the leach solution. Pregnant leach solution is then treated by solvent extraction and precipitation techniques to separate and recover those metals contained in solution.

Off gas from the reduction step comprises a mixture of carbon dioxide and unreacted carbon monoxide and this off gas may be directly regenerated to essentially pure carbon monoxide by passage through a coke or carbon bed maintained at a temperature of about 1050° to 1100°C. Thus, we have developed a process for the extraction of non-ferrous metals from oxide ores which operates at temperatures substantially below those conventionally used in the prior art; in which energy requirements are relatively low; in which only coke and oxygen are consumed and in which all chemical reagents are recycled so that no contaminating effluents are produced.

Hence, it is an object of our invention to recover non-ferrous metals from their oxide ores.

It is another object of our invention to reduce non-ferrous metal oxides to their elemental state without substantial reduction of iron oxides contained in the ore.

Another object of our invention is to leach non-ferrous metals from reduced ores without interference from iron.

A specific object of our invention is to recover nickel and cobalt (if present) from lateritic ores in high yield.

DETAILED DESCRIPTION OF THE INVENTION

Figure 1:
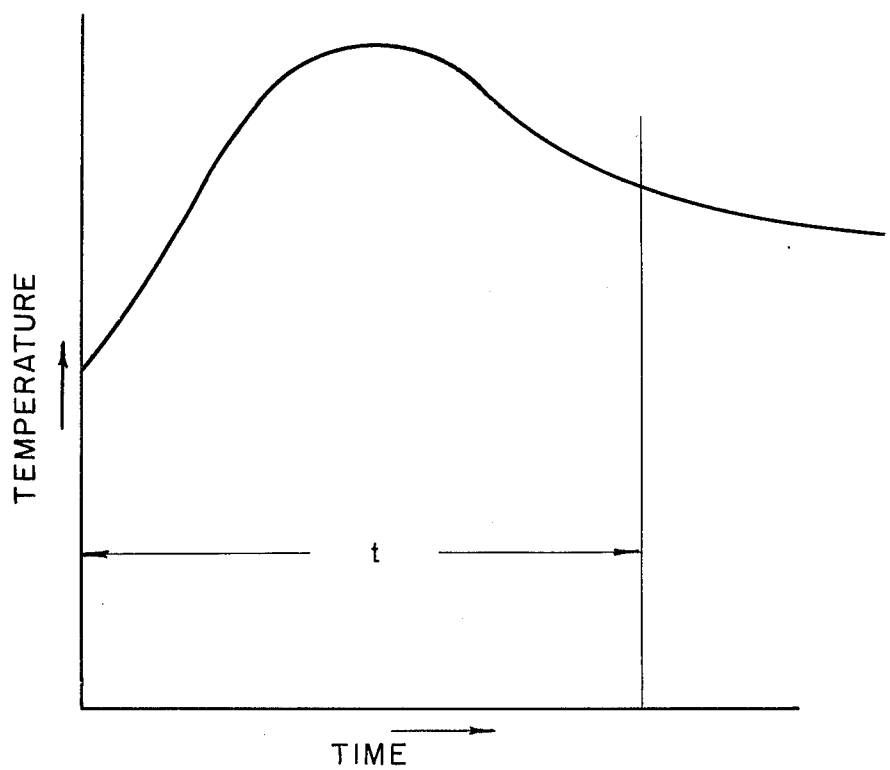
FIG. 1 illustrates a typical temperature-time plot obtained in a batch reduction of an ore.

We have discovered that non-ferrous metals including nickel, cobalt and copper may be recovered from iron-containing oxide ores or oxide ore concentrates in extremely high yield by means of a process which includes a selective reduction step, an oxidizing ammonia-ammonium salt leach and an extraction and recovery of those metals in a substantially pure form from the pregnant leach liquor. For the purposes of this disclosure, the terms "oxide ores" and "oxide ore concentrates" specifically include both naturally occuring oxide ores of nickel, cobalt and copper and those ores and ore concentrates which have been converted to the oxide form by techniques such as roasting. Examples of naturally occurring oxide ores amenable to treatment by our process are lateritic nickel-cobalt ores including laterite, saprolite, serpentine, garnierite and the like as well as oxidic ores of copper such as chrysocolla, azurite and malachite. Examples of ores and ore concentrates converted to the oxide form and amenable to treatment by our process include the roasted, preferably dead roasted, sulfide ores and ore concentrates of such minerals as chalcopyrite, bornite, pentlandite, millerite, linnaeite, carrolite and the like. Ocean floor nodules of the type containing iron, manganese, copper, nickel and cobalt may also be treated by our process to recover the non-ferrous metal values.

The first step in our process consists of a highly selective, low temperature reduction which converts substantially all of the contained nickel, cobalt and copper in the ore to a highly active elemental metal while leaving the bulk of iron oxides in the ore in a non-reduced or partially reduced state. Certain conditions must be met in order to achieve this result. No water vapor can be present, or if present at all, must be held to very low levels, during the reduction. Presence of water vapor decreases the selectivity of the reduction step and appears to produce a less active form of the reduced metals. Hence, ores or ore concentrates must be dehydrated prior to reduction. This requirement also precludes use of hydrogen or hydrogen containing gases, such as producer gas, as reductants. Substantially pure carbon monoxide is our preferred reductant. Small concentrations of carbon dioxide can be tolerated but as the carbon dioxide content of the reductant gas increases, selectivity of the reduction step decreases as does the percentage of non-ferrous metals which are reduced to elemental form.

Use of substantially pure carbon monoxide as the reductant also introduces another advantage to our process. During the reduction, carbon monoxide is converted, at least in part, to carbon dioxide. This exiting gas stream may then be regenerated by passing it through a coke bed heated to a temperature of about 1050°C or higher to produce substantially pure carbon monoxide. Were water vapor present in the reducing gas, hydrogen would also be produced by reaction with coke thus precluding use of this method of reductant gas production.

Temperatures used in the reducing step can range from about 350°C to 600°C with a preferred temperature range of about 440° to 550°C. Despite teachings to the contrary which can be found in the prior act, such as in U.S. Pat. No. 2,998,311, we have found that reduction of lateritic ores can be accomplished rapidly and completely within our disclosed temperature range when using carbon monoxide as the sole reductant. While reduction temperatures above 600°C can be used, as is common in the prior art, selectivity of the reduction decreases. Also, high reduction temperatures lowers the amount of non-ferrous metals which can later be extracted by leaching. When lateritic ores are reduced by our process, reduction temperatures must be maintained below that level at which chemically bound silicate water begins to be driven off. Laterite ores begin to lose chemically bound silicate water at temperatures above about 600° to 650°C and all silicate water is expelled at temperatures of about 800° to 850°C. On the other hand, laterite ores also contain water associated with iron oxides, probably in a hydrate form. This water, called limonitic water for the purposes of this disclosure, is essentially completely driven off at a temperature of about 350°C. Hence when treating laterites by our process, it is necessary to dehydrate the ore so as to remove limonitic water prior to reduction. Ore concentrates which have been converted to the oxide form, as by roasting are, of course, also dehydrated as well by the roasting step.

The reduced ore contains elemental metals in a highly active state. Such reduced ores are pyrophoric and will actually flame if exposed to oxygen even after cooling to ambient temperature. At temperatures above about 200°C, the reduced ores are sufficiently active to react with water producing hydrogen gas. Presumably, this reaction requires the oxidation, or partial oxidation, of the elemental metals present in the reduced ore. This reaction also indicates that the reduced metals are present in a different and higher state of activity when the reduction is performed using carbon monoxide in the absence of water vapor than when water vapor is present in the reducing gas or is produced in the reduction step by use of hydrogen as a reductant. Because of this characteristic of ore reduced by our process, a cooling step is required after reduction and before the reduced ore is introduced into a leach solution. Cooling of course must be accomplished under an inert atmosphere.

Since the reduction reaction is only mildly exothermic, we find it advantageous to introduce the dehydrated ore into the reduction zone at a temperature approximating that at which the reduction is accomplished. Heat balance studies show that the reduction reaction of carbon monoxide with typical laterite ores is self sustaining over the entire temperature range within which our process operates. Carbon monoxide produced by reaction of carbon dioxide with hot coke can also be utilized to provide additional heat to the reduction reaction to compensate for heat losses from the system. Thus, the reduction can be accomplished without the provision for heating means within the reduction vessel. A variety of types of apparatus may be used to carry out the reduction reaction but we prefer those devices which allow for counter current contact of the ore and reducing gas. We prefer to use a multiple hearth furnace of the Herreshoff type for carrying out the reduction. Fluidized bed-type reactors are much less preferred, especially with laterite ores, because of the dusting problems encountered with such finely divided materials.

The reduced ore is then cooled under an inert, or reducing (carbon monoxide) atmosphere, to a temperature below about 200°C. Cooled, reduced ore is dispersed in a leach solution with attrition and mixing as in a ball mill or similar device. Leaching is accomplished using an ammonia-ammonium salt solution in the presence of oxygen gas. Dissolution of the reduced metals in the oxygenated, ammonia-ammonium salt solution proceeds by a process of oxidation wherein nickel and copper are oxidized to their +2 valence states and cobalt is oxidized to its +3 valence state. These oxidized metals go into solution as their ammine complexes and an excess of ammonia must be present in the leach solution at all times to prevent precipitation of the metals as their hydroxides.

Our preferred leach solution comprises a relatively concentrated aqueous mixture of ammonium sulfate and ammonia. The leach solution may contain from about 50 to 400 gpl ammonium sulfate and from about 25 to 150 gpl ammonia. However, in order to obtain rapid leach rates and high extraction of metals from reduced ores, the concentration of ammonium sulfate must be equal to or greater than the concentration of free ammonia. It is preferred that the concentration of ammonium sulfate be at least double that of free ammonia. Relatively concentrated leach solutions are preferred especially for those ores containing cobalt. High recovery of cobalt from reduced cobalt-containing ores, such as Oregon laterites, generally require a leach solution in which the sum of the concentrations of ammonia and ammonium sulfate approach or exceed 200 gpl ammonia. We have found that a leach solution containing about 50 gpl ammonia and about 300 gpl ammonium sulfate gives about optimum results for most ores. Commercial anhydrous ammonia and fertilizer grade ammonium sulfate are of sufficient purity to give completely satisfactory results as leach reagents.

The leaching step is preferably carried out in a closed vessel with agitation at essentially atmospheric pressure. Leach temperatures may conveniently range from about 5° to 50°C and it is preferred to perform the leaching step at ambient or near ambient temperatures. Essentially no advantage is gained by leaching at temperatures above about 50°C while more elevated temperatures, on the order of 80°C, tend to decrease the leaching efficiency as well as unduly increase the ammonia pressure within the leach vessel. While air can be used to provide oxygen to the leaching step, we strongly prefer to employ essentially pure oxygen as this obviates the need for ammonia recovery from the nitrogen fraction of air. Solids concentration in the leach solution should be maintained at a sufficiently low level as to allow thorough agitation without settling. A solids concentration in the leach solution of about 15 to 20% is generally appropriate.

High recovery of non-ferrous metals from reduced ores, especially from those ores such as laterites which are very high is iron content, requires a careful control of the leach process. All iron which was reduced to the elemental state is, of course, oxidized during the leach. Iron oxidation proceeds in a stepwise fashion, first to the ferrous state and later to the ferric state. Ferrous iron is soluble in the leach solution while ferric iron precipitates as a gelatinous hydrated oxide. If oxidation of ferrous iron to the ferric state is allowed to occur before the non-ferrous metals are oxidized and stabilized in solution as their ammine complexes, they hydrated ferric oxide, or ferric hydroxide, is precipitated and forms a coating or film on ore particles which essentially precludes further extraction of metals from the ore. Additionally, the ferric hydroxide tends to occlude other metal ions thus further decreasing recovery.

We have found that the leach process may be controlled in such a fashion that essentially complete oxidation of nickel, cobalt and copper may be accomplished and those metal ions stabilized in solution as their ammine complexes prior to oxidation of ferrous iron to the ferric state. In order to achieve this result, it is necessary to limit the oxidation rate during the initial stages of the leach to a level substantially below that at which the reduced ore slurry is capable of reacting with oxygen. By maintaining an oxygen deficiency in the leaching step, ferrous iron is not converted to its ferric state until oxidation of the non-ferrous metals, and their stabilization in solution, is essentially complete. Thus, precipitation of gelatinous ferric hydroxide on and in ore particles during the terminal stage of the leach does not adversely affect yield of non-ferrous metals.

After leaching is complete, the leach solution is separated from the ore residue and the non-ferrous metals contained in the leach solution are separately recovered. Recovery is preferably accomplished by selective solvent extraction using such extracting agents as the α-hydroxy oximes dissolved in a hydrocarbon such as kerosene. Liquid-liquid solvent extraction is especially preferred for the extraction of nickel from pregnant solutions obtained in the leaching of reduced laterite ores. In this case, use of the α-hydroxy oximes marketed by General Mills under the designation, LIX-64N provide nearly quantitative extraction of nickel while providing a very high degree of selectivity for nickel over trivalent cobalt. Additionally, nickel may be readily stripped from the hydrocarbon phase by contact with dilute sulfuric acid having an entering pH of about 1.5 – 2.0. The resulting nickel sulfate solution can then be treated in an electrowinning cell to recover elemental nickel and regenerate sulfuric acid. As sulfuric acid extracts nickel from the solvent solution, the pH rises because of hydrogen ion exchange between the acid and oxime extractant. The pH level of the stripping solution must be maintained below about 4.0 else nickel begins to precipitate as the hydroxide. However, it is highly desirable that the nickel-loaded stripping solution entering the electrowinning cell have a pH above about 3.0 because at pH levels between about 3.0 and 3.9 current efficiencies in the electrowinning cell reach a maximum; exceeding 95%.

Turning now to the drawings, FIG. 1 depicts a typical plot of temperature versus time obtained in the selective reduction of an iron-containing non-ferrous metal ore on a batch basis. The reduction is mildly exothermic (for more ores) and proceeds rapidly requiring from about 10 minutes to an hour or so depending upon reduction temperature and metal content of the ore. The more easily reduced nickel, cobalt and copper oxides react first and fastest producing a rapid rise in temperature as is shown by the plot. As the reduction of these non-ferrous metals becomes substantially complete, temperature tends to drop and later level off. Time $t$, shown in the Figure, represents that point at which selectivity of the reduction reaction is optimum; that is, non-ferrous metals are essentially completely reduced while iron reduction is at a minimum. Continued reduction after this time results in increasing amounts of iron being reduced to the metallic state. While a batch-type reduction of the sort illustrated by the plot of FIG. 1 may of course be used in our process, it is much more feasible to carry out the reduction on a continuous basis. However, batch-type tests can be advantageously used to delineate most favorable reaction times and temperatures for control of a continuous reduction reaction.

Figure 2:
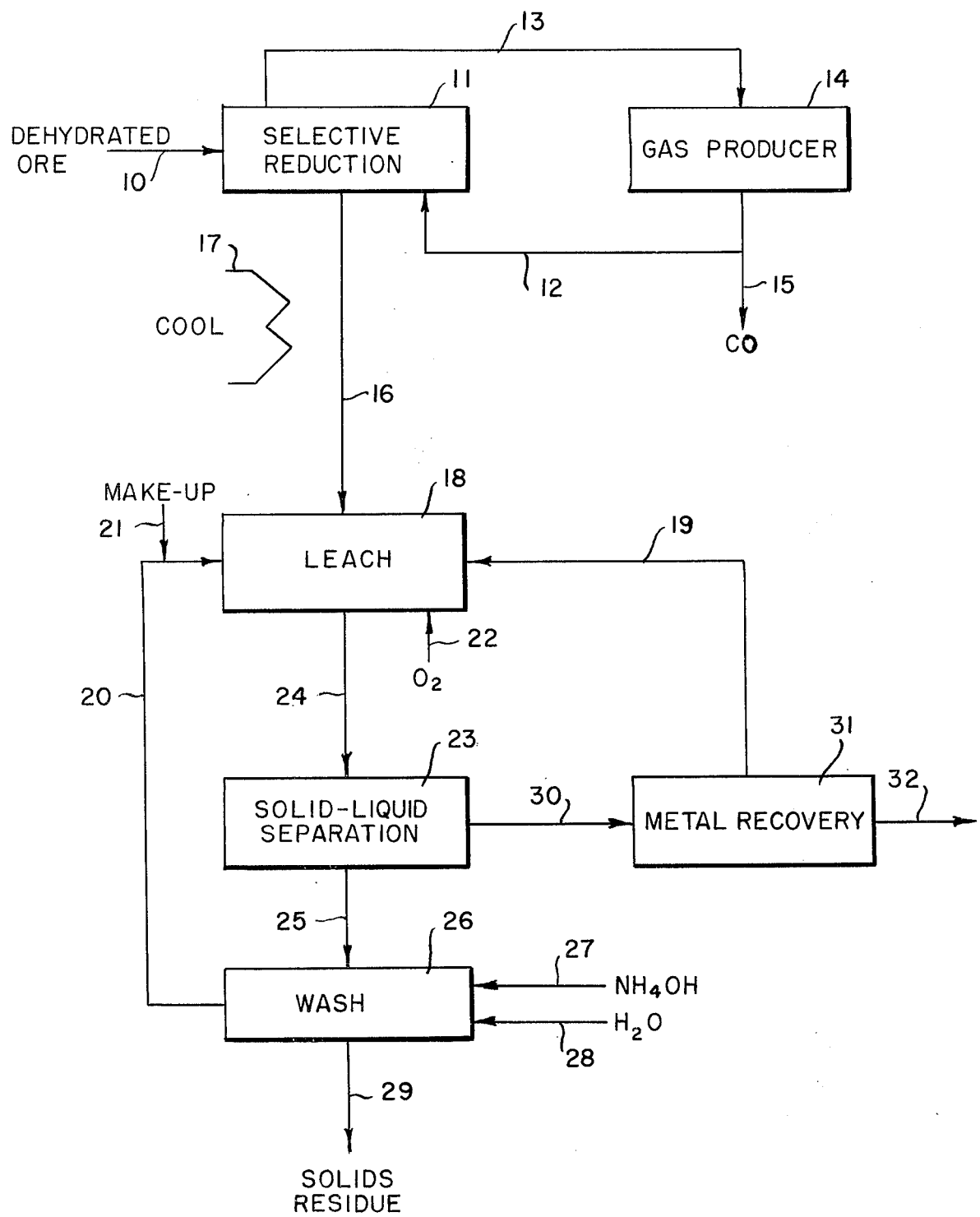
FIG. 2 depicts a generalized flowsheet of our process applicable to iron-containing, non-ferrous metal oxide ores or their concentrates.

FIG. 2 is a diagrammatic flow sheet representing our process in its most general form. A dehydrated oxide ore 10 is subjected to a selective reduction 11 using carbon monoxide stream 12 as the sole reductant. For the purpose of this disclosure, the term "dehydrated" is defined to mean drying of sufficient severity as to preclude release of additional water under the temperature range encountered in the selective reduction, or from about 350° to 600°C. Gaseous reduction exhaust stream 13, comprising mostly carbon dioxide, is then recycled to gas producer 14 where the carbon dioxide is converted to the monoxide. Gas producer 14 may comprise a coke bed heated to a temperature, above about 1050°C, which favors the essentially complete conversion of carbon dioxide to carbon monoxide according to the following formula:

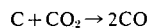

$$C + CO_2 \rightarrow 2CO$$

As may be appreciated from that formula, recycle of the entire exhaust stream from the reduction produces an excess of carbon monoxide which may be withdrawn via line 15 for use as fuel to supply process heat as in the ore dehydration. Alternatively, only enough of exhaust gas 13 to supply the requirements of the reduction reaction need be recycled.

The coke bed of gas producer 14 may be heated in any manner that does not introduce detrimental contaminants into the reducing gas stream. Electrical heating is feasible for this purpose but it is preferred to heat the coke bed by introducing oxygen into the bed at a rate sufficient to maintain it at the desired temperature. When oxygen introduction is used to heat the coke bed, there results an even greater excess of carbon monoxide. The total excess of carbon monoxide is sufficient to provide fuel for the dehydration of lateritic ores. It is possible, but less desirable to use air instead of oxygen to heat the coke bed but this results in a dilution of the reducing gas stream with nitrogen. Nitrogen is inert to the process but such a diluted reducing gas stream requires the use of higher gas velocities or longer retention times within the reducing furnace as well as affecting the heat balance of the process.

Reduced ore is removed from reduction zone 11 by way of means 16 and is cooled by indirect contact heat exchange means 17 to a temperature below that at which the reduced ore displays reactivity to water. Cooled, reduced ore is then introduced into leaching means 18 which comprises a closed vessel having agitating means to keep the reduced ore in a suspended state during leaching. Leach solution, comprising a relatively concentrated aqueous ammonia-ammonium sulfate solution, is introduced into means 18 as recycle stream 19, wash stream 20 and make-up stream 21. Leaching is continued in the presence of free oxygen, introduced via line 22, until the non-ferrous metals have been oxidized and stabilized within the solution as their ammine complexes.

Leached ore and pregnant leach solution are then passed to solids-liquid separation means 23 by way of conduit means 24. Means 23 may comprise a filter, settler, centrifuge or other conventional apparatus capable of performing the separation. Solids fraction 25 from separation means 23 is then washed in means 26 first with an ammonium hydroxide solution 27 to recover ammonium sulfate and adsorbed pregnant leach solution and then with water to recover any ammonium hydroxide in the solids fraction. Waste solids 29 are discharged from the wash step while the wash solutions are recycled to the leaching zone via line 20. Pregnant leach solution, recovered from separation means 23, is passed via line 30 to metal recovery means 31 wherein metal values 32 are removed from the leach solution. Metal recovery means 31 preferably comprises a solvent extraction wherein non-ferrous metals are selectively removed from the pregnant leach solution leaving a metal-depleted solution which is recycled back to the leaching step via line 19.

Figure 3:
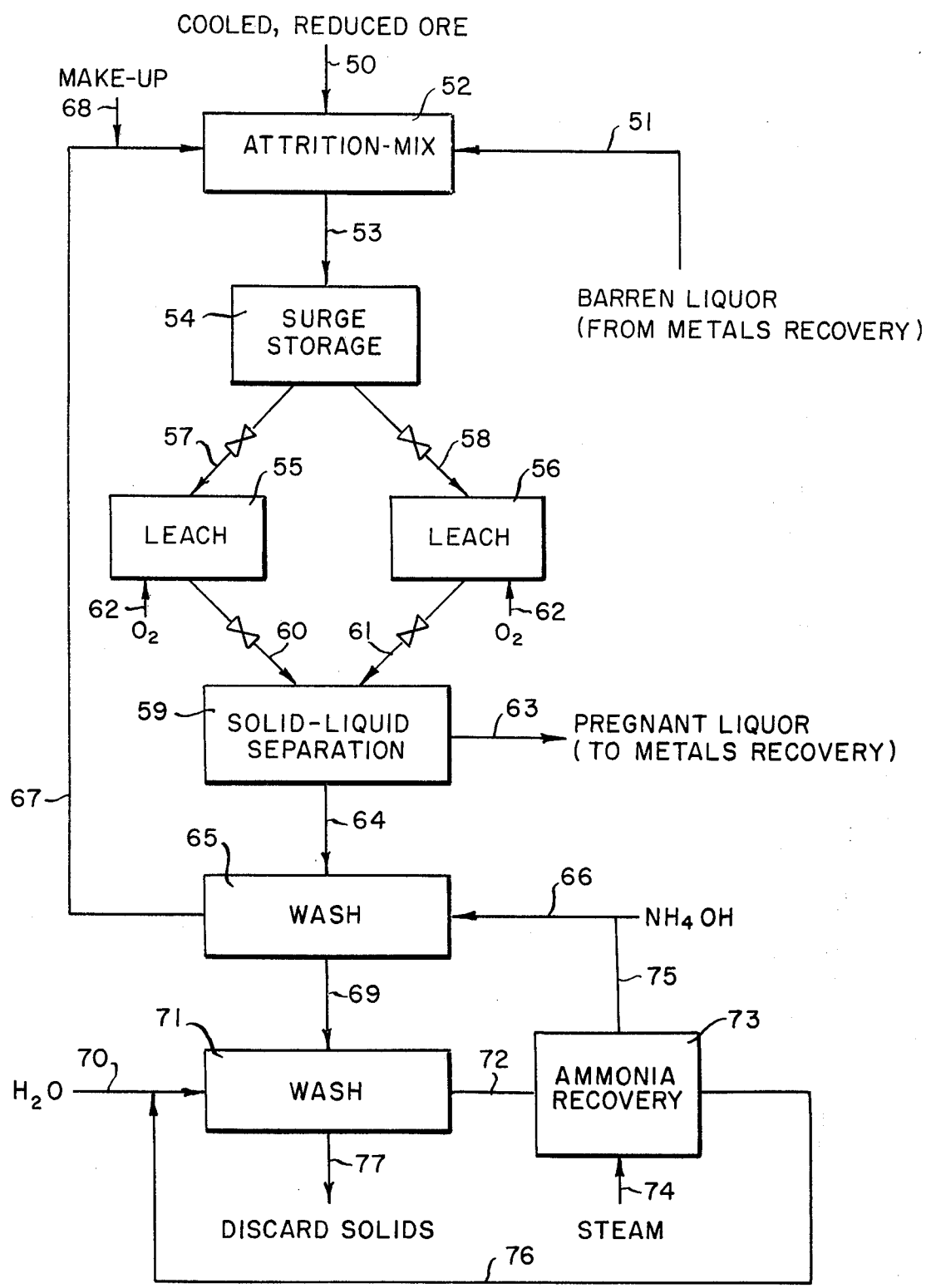
FIG. 3 is a flowsheet of the leaching step of our process.

FIG. 3 depicts one embodiment of the controlled leaching step of our process. In this embodiment, cooled, reduced ore 50 is mixed with a barren leach liquor stream 51 in means 52 which may comprise a ball mill, rod mill or similar device. The ore, now suspended in leach solution, is then passed via line 53 to surge storage means 54 which comprises a closed vessel with agitation means adequate to maintain the ore in a suspended state. Leaching of the reduced metals from the ore is accomplished on a batch-type basis using multiple leaching vessels 55 and 56 so as to allow for continuous operation of the process. While two leaching vessels are shown in the drawing, three or more vessels may be used if so desired.

Leach vessels 55 and 56 are connected to surge storage 54 by means of conduits 57 and 58 and to solid-liquid separation means 59 by conduits 60 and 61; each of the conduits being equipped with appropriate flow control valves. In operation, leach vessel 55 is filled with ore slurry from storage means 54 and oxygen is introduced from source 62, preferably at or near the bottom of the leach vessel, as a dispersion of fine bubbles. During the early part of the leach, the rate of oxygen introduction is controlled at a level substantially below that at which the reduced ore is capable of reacting with the oxygen. By maintaining an oxygen deficiency during the early stages of the leach, oxidation of ferrous iron to the ferric state is essentially precluded thus avoiding the precipitation of ferric hydroxide. An oxygen deficiency is maintained in the leach vessel until at least 90% of the reduced non-ferrous metals are oxidized and stabilized within the solution as their ammine complexes and the bulk of iron oxidized to the ferrous state. After this time, rate of oxygen introduction can be increased to the maximum rate at which the ore slurry can react with the introduced oxygen. This maximum rate is easily determinable by increasing the oxygen introduction rate until pressure within the leach vessel begins to increase or until oxygen appears in a vent stream removed from the vessel. During the oxygen-deficient stage of the leach, it is necessary to maintain the oxygen introduction rate at a level below 50% of the maximum reaction rate of oxygen with the reduced ore slurry and it is preferred to hold the oxygen introduction rate below 25% of that level. Completion of the leaching reaction is indicated by a cessation of oxygen uptake by the ore slurry.

Time required to complete the leach of course varies with the metallic content of the ore, with the rate of oxygen introduction and with the solids content of the ore-leach solution slurry. In the case of a laterite ore having a nickel content of about 1 to 1.2%, a cobalt content of 0.2 to 0.3%, an iron content of about 35 to 40%, and a solids content in the leach solution of about 15 to 20%, leaching can be accomplished in well less than one hour to obtain an extraction of more than 90% of the total nickel and more than 85% of the total cobalt.

After leaching of the ore slurry contained in vessel 55 is completed, the pregnant leach solution and ore residue is passed to solid-liquid separation zone 59 by way of line 60 while leach vessel 56 is filled from storage means 54 and leaching is accomplished in the manner previously described. Thus, the two leach vessels while operating in a batch mode, allow for a continuous processing of ore and leach solution. Solid-liquid separation means 59 may comprise a settling vessel, a centrifuge, a filter or similiar devices. There is recovered from means 59 a pregnant leach liquor stream 63 which is further processed for recovery of those metals contained in solution while the solids residue 64 is passed to first wash zone 65. Solids in zone 65 are washed with an ammonium hydroxide solution 66 to solubilize ammonium sulfate and residual leach solution contained in the residue and this wash solution is recycled to the attrition-mixing step 52 by way of conduit 67. Make-up leach solution may be added to the process via line 68.

Solids 69 from wash zone 65 are next washed with water stream 70 in wash zone 71 to remove ammonium hydroxide from the previous washing step. Wash water 72 from zone 71, containing ammonia in solution may be passed to ammonia recovery means 73 wherein steam 74 is passed through the wash solution to strip ammonia 75 which may then be merged with ammonium hydroxide wash stream 66. Water stream 76, stripped of its ammonia content, may be recycled to wash zone 71 while a solids residue 77 may be discarded from wash zone 71.

Figure 4:
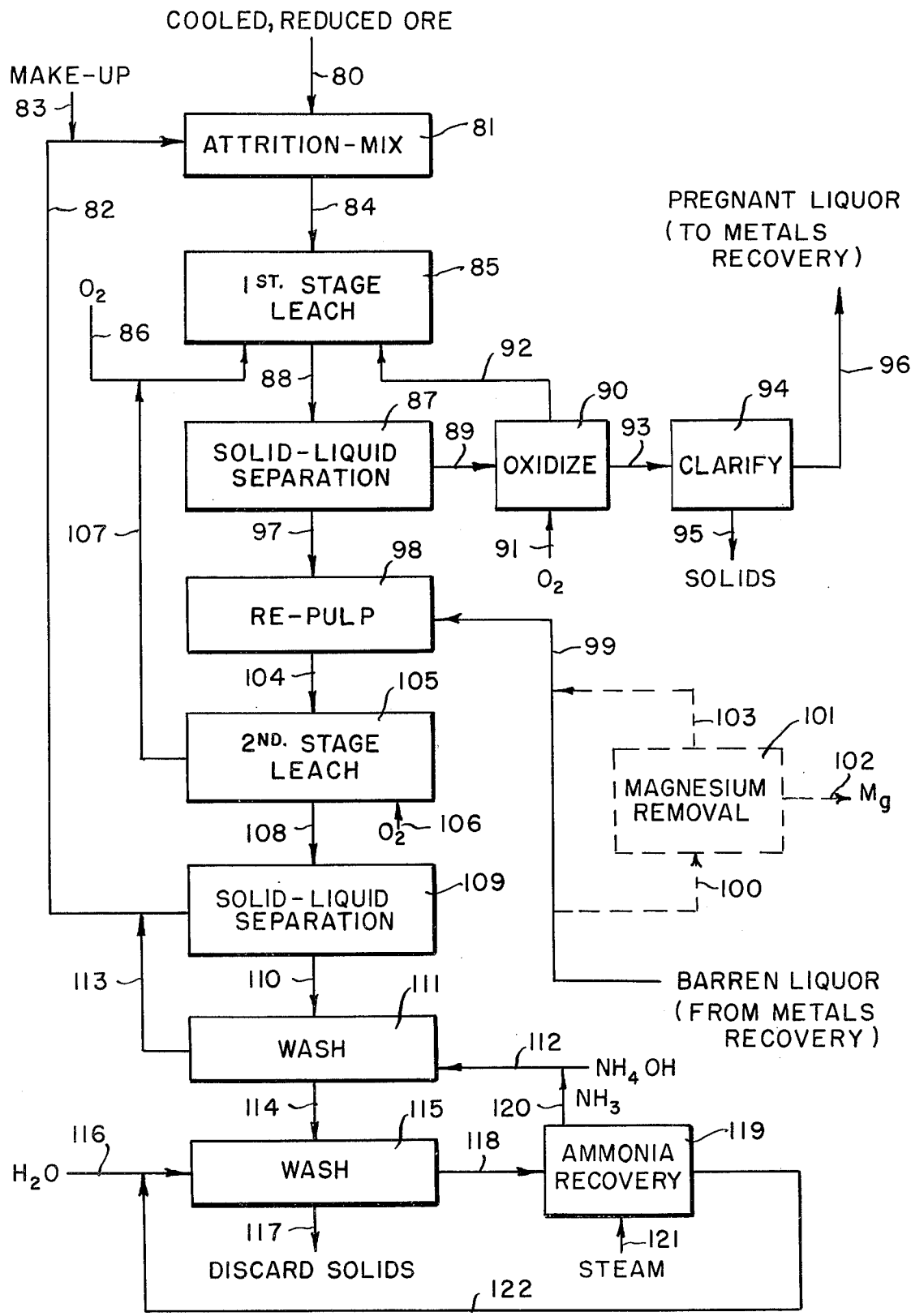
FIG. 4 illustrates an alternative leaching procedure.

FIG. 4 illustrates another embodiment of the controlled leaching steps of our process. As in FIG. 3, cooled reduced ore 80 is passed into an attrition-mixing means 81 where it is dispersed in leach solution 82, recovered from a later step in the process, along with make-up leach solution 83. The slurry of reduced ore and leach solution 84 is then passed to a first stage leach zone 85 which consists of a closed vessel having agitation means adequate to maintain the particulate ore in suspension. Oxygen from source 86 is sparged into leach vessel 85 at or near the bottom of vessel 85. The first stage leach is carried out in oxygen-deficient conditions (compared to the rate at which the slurried ore is capable of reacting with oxygen) as was described in relation to FIG. 3. Retention time of the ore slurry within the first stage leach zone is sufficient to allow at least 75% and preferably more than 90% of the non-ferrous metals contained in the ore to be oxidized and stabilized within the solution as their ammine complexes. The rate of oxygen introduction and the retention time of slurried ore within leach 85 are limited so as to avoid oxidation of ferrous iron to ferric iron with its attendant precipitation as the hydroxide.

Ore, substantially depleted in non-ferrous metal content, and pregnant leach solution are passed from leach zone 85 to solids-liquid separation means 87 by way of conduit 88. The pregnant leach solution recovered from means 88 is passed via line 89 to oxidation means 90 where it is treated with oxygen from source 91 for a time sufficient to oxidize all ferrous iron in the leach solution to the ferric state. Unreacted oxygen from means 90 may be passed via line 92 to the first stage leach zone 85. Leach solution, now carrying ferric hydroxide in suspension, is conveyed via line 93 to clarification means 94 where a solids fraction 95, comprising mostly ferric hydroxide, is removed and a pregnant leach liquor 96 is recovered for further processing to remove the metals therefrom.

Ore solids 97, recovered from separation means 87, are re-pulped in mixing means 98 with a barren leach solution 99 which is returned to the process after extraction of the metals therefrom. If the ore being treated contains magnesium compounds as do such ores as laterites, some magnesium dissolves in the leach solution as magnesium sulfate. In these cases, a bleed stream 100 is taken from barren leach solution 99 and is treated in means 101, which may comprise ion exchange, to remove magnesium 102 and return the magnesium-depleted solution to line 99 via conduit 103. Repulped ore 104 is subjected to a second stage leach in vessel 105 with the introduction of excess oxygen from source 106. Unreacted oxygen may be passed via line 107 to the first stage leach.

Slurried ore and leach solution 108 are removed from the second stage leach 105 and subjected to a second solids-liquid separation in means 109 to recover metals-containing leach solution 82, which may be recycled to mixing zone 81, and a solids residue 110. Residue 110 is washed in means 111 with an ammonium hydroxide solution 112 and the wash solution 113, now containing residual leach solution and dissolved ammonium sulfate, is merged with the leach solution from separation zone 109. Solids 114, from the ammonium hydroxide wash, are subjected to a second wash in means 115 using water stream 116 as the washing agent, to remove ammonium hydroxide from the ore residue. Washed ore residue 117 is discarded as waste and the wash effluent 118 is passed to ammonia recovery zone 119 where ammonia stream 120 is recovered by stripping with steam 121. Wash effluent, after being stripped of ammonia, may be recycled to the water wash step by way of line 122. While liquid-solids separation means 109, wash stage 111 and wash stage 115 have been shown as separate process operations, these steps may be accomplished in the same piece of apparatus as for instance a filter with multiple wash stages.

Figure 5:
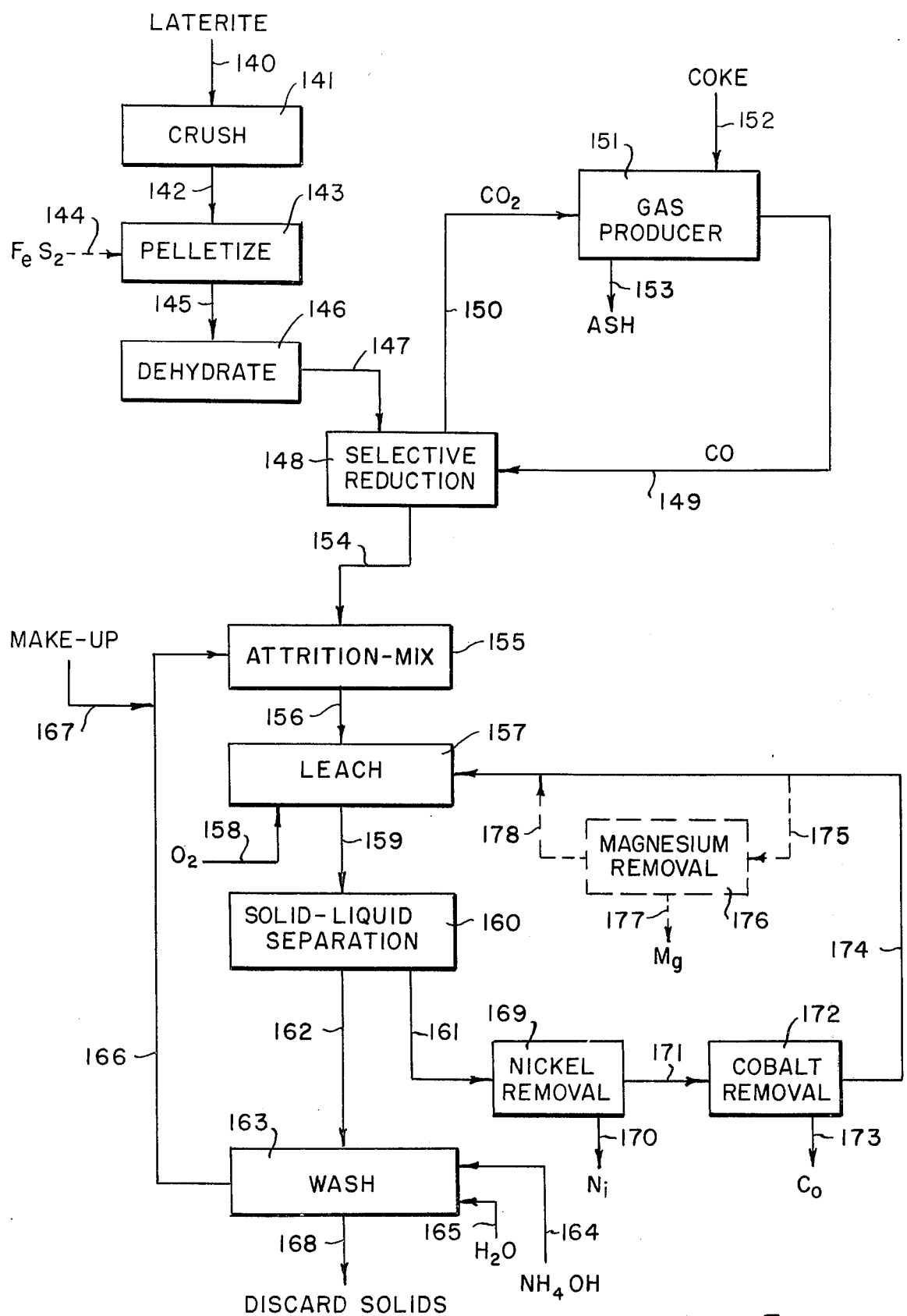
FIG. 5 depicts a flowsheet of our process for the extraction of nickel and cobalt from laterite ores.

Referring now to FIG. 5, there is shown an embodiment of our invention for the extraction of nickel and cobalt (if present) from laterite ores. Laterite ore 140 is crushed in mill 141 and the crushed ore 142 is then pelletized in conventional fashion in means 143. Because of the extremely finely divided state of typical laterite ores, pelletizing is highly advantageous in controlling dusting during the subsequent reduction step. Water alone is satisfactory as the pelletizing liquid; no binders are necessary. In those laterite ores which contain any substantial amount of magnesia, above about 5%, addition of a sulfur containing material, such as finely ground pyrite 144, enhances the recovery of nickel obtained by the process. For most magnesium containing laterite ores, addition of about 0.5 to 2.5% pyrite is appropriate. While the effect of pyrite addition is not clearly understood, it is believed that sulfur contained in the pyrite inhibits the formation of insoluble nickel magnesium silicates formed during the later reduction.

Pelletized laterite 145 is then dehydrated in means 146 which may comprise a rotating drum drier or kiln. Dehydration temperature must be sufficiently high to drive off all free water, much of which was added during pelletization, and to drive off limonitic water associated with the iron oxides contained in the ore. From a practical point of view, this requires a minimum dehydration temperature of about 350°C. It is preferred that the ore be heated during dehydration to the temperature at which the subsequent selective reduction is performed, or between about 350° and 600°C. There is no advantage to be gained by dehydration at higher temperatures at which the chemically bound silicate water if driven off. Silicate water begins to be evolved at a temperature of about 650°C and is completely driven off at a temperature of about 825°C. Were higher temperatures used, it not only would require substantially increased heat input but the ore would then require cooling prior to reduction.

Dehydrated ore 147 is then selectively reduced in means 148 which preferably comprises a multiple hearth furnace. Since the ore pellets are relatively fragile, reduction means in which the pellets are subjected to abrasion, as in a fluidized bed, are not desirable for use in our process. Carbon monoxide stream 149 is used as the sole reductant. While the carbon monoxide need not be highly pure, presence of carbon dioxide in the entering reductant gas stream decreases the recovery of both nickel and cobalt obtainable. We prefer that the carbon monoxide reductant stream contain less than about 3% carbon dioxide and most preferably less than about 1% carbon dioxide. Carbon monoxide is passed in counter flow fashion to the ore within furnace means 148 causing nickel and cobalt oxides contained in the ore to be reduced to their elemental state with carbon monoxide being converted to the dioxide. Some reduction of iron oxides to lower oxides or to the metal also occurs. However, under the reduction conditions of our process, the reduction is extremely selective; as little as 10 to 15% of the iron being reduced at the time nickel and cobalt reduction is essentially complete.

Carbon dioxide exhaust gas 150 from the reduction reaction is regenerated in gas producer 151 wherein the carbon dioxide stream is passed through a coke bed maintained at a temperature favoring the substantially complete conversion of carbon dioxide to the monoxide. For example, at a coke temperature of 1070° to 1100°C conversion of carbon dioxide to the monoxide exceeds 99%. Fresh coke 152 may be added in an intermittant or continuous fashion to gas producer 151 and an ash residue 153 may be removed from means 151 in like fashion. It is preferred that carbon monoxide stream 149 be introduced into reduction means 148 at a temperature at least as high or higher than the reduction temperature of the ore. By carrying out the dehydration step at the temperature of the later reduction and by introduction of the carbon monoxide reductant stream at a temperature level at or above the reduction temperature, there is avoided the need for any additional heat input to the reduction reactor since the reduction reaction is mildly exothermic. We prefer to carry out the reduction reaction of laterites at a temperature ranging from about 400° to 600°C. In the case of laterites containing significant amounts of magnesium, we prefer reduction temperatures of about 500° to 600°C and have found in the case of Oregon lateritic ores that a reduction temperature of about 550°C is about optimum. At these temperatures, reduction is substantially complete within about 15 to 50 minutes.

Reduced ore 154 from furnace 148 is cooled to a temperature below about 200°C and is thereafter slurried with an aqueous ammonia-ammonium sulfate leach solution in attrition-mixing means 155. Attrition in means 155 is for the purpose of disintegrating the ore pellets so as to allow a faster and more complete leach. Ore slurry 156 is then subjected to a leach in means 157 in the presence of oxygen introduced from source 158. Leached ore and leach solution 159 is then passed to solid-liquid separation means 160 to recover a pregnant leach liquor stream 161 and a solids residue fraction 162. Residue 162 is then washed in means 163 first with an ammonium hydroxide solution 164 and then with a water stream 165. Wash effluent 166 may be recycled to attrition-mix zone 155 along with make-up leach solution 167 while washed solids residue 168 may be discarded as waste. Alternatively, residue 168 may be further processed in a magnetic separation step, preferably using a high intensity wet magnetic separator, to recover an iron oxide concentrate suitable as an iron ore leaving a gangue residue comprising mostly silicon, magnesium and aluminum oxides. Leach 157, solids-liquid separation 160 and wash 163 are preferably carried out in accordance with the more detailed flow sheets depicted in FIGS. 3 and 4.

Pregnant leach solution 161, typically containing 0.3 to 3% nickel and 0.1 to 0.5% cobalt in solution, is first passed to nickel removal zone 169 where there is recovered, preferably by solvent extraction, a nickel product 170. Nickel-depleted leach solution 171 is then treated to remove cobalt from solution in means 172 to recover a cobalt product 173 and a barren leach solution stream 174. A bleed stream 175 may be taken from the barren leach solution and passed through magnesium removal means 176 to remove a magnesium fraction 177 from solution, with return of the magnesium-depleted stream to the barren leach solution via conduit 178, in order to avoid buildup of magnesium sulfate within the leach solution.

Figure 6:
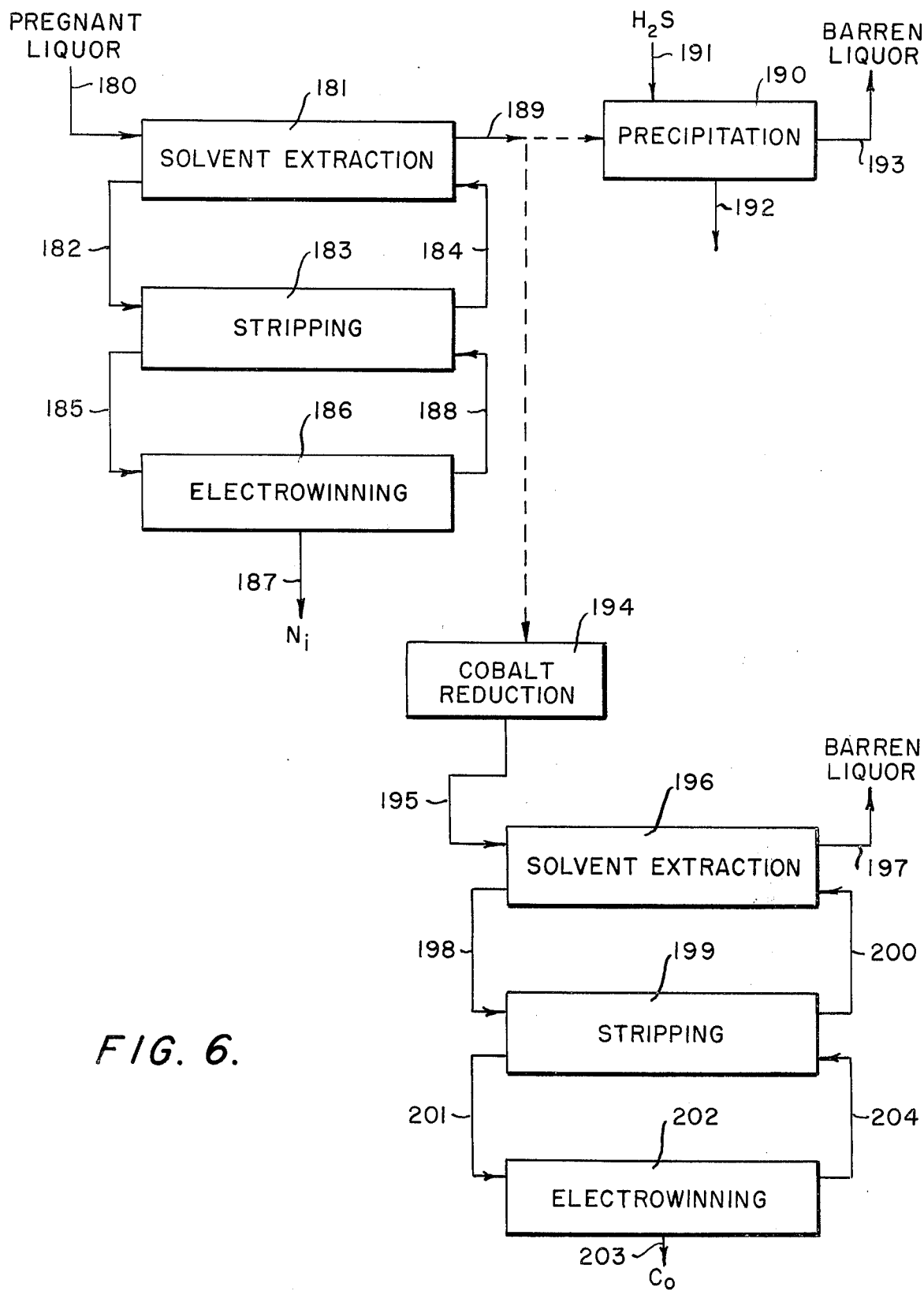
FIG. 6 illustrates preferred techniques for recovery of nickel and cobalt from pregnant leach liquors produced by our process.

FIG. 6 illustrates techniques appropriate for use in recovering nickel and cobalt from the pregnant leach solution of our process. Leach solution 180 is subjected to a liquid-liquid solvent extraction 181 which preferably comprises a multi-stage countercurrent mixer-settler unit using an $\alpha$-hydroxy oxime dissolved in a hydrocarbon solvent as the extracting agent. Such extracting agents are commercially available under trade names such as General Mills LIX-64N and their use in extracting nickel and cobalt from ammoniacal leach liquors is described in U.S. Pat. No. 3,276,863. A nickel-loaded organic phase 182 is recovered from solvent extraction zone 181 and is passed to stripping stage 183 where it is contacted, preferably in countercurrent fashion, with a dilute mineral acid, preferably sulfuric acid. Since cobalt present in leach solution 180 is in the trivalent state as a result of the oxidative leach, a very selective separation of nickel from cobalt is accomplished. The extracting agent, stripped of its nickel content, may be continuously recycled to solvent extraction means 181 via line 184.

A dilute solution of nickel dissolved in sulfuric acid 185 recovered from stripping zone 183 is then subjected to an electrowinning step in cell 186. Electrowinning cell 186 preferably is of the diaphram type using nickel cathodes and inert anodes which may be fabricated of lead. A metallic nickel product 187 is recovered as a cathode deposit and a regenerated acid stripping solution 188 may be recycled to stripping zone 183.

Raffinate stream 189, recovered from solvent extraction 181, is then subjected to a further treatment for recovery of the contained cobalt. Optionally, raffinate 189 may be passed to precipitation means 190 where it is contacted with hydrogen sulfide from source 191 to produce a cobalt sulfide precipitate 192 and a barren leach liquor stream 193. Barren leach solution 193 may be recycled to the leaching step of the process. Alternatively, raffinate stream 189 may be passed to cobalt reduction means 194 where cobalt present in the raffinate is reduced from its trivalent to its divalent state. Reduction may be accomplished electrolytically or may be accomplished by contact of the raffinate stream with cobalt metal which is preferably in a finely divided state.

A leach solution stream 195, now containing cobalt in the divalent state, is then subjected to a liquid-liquid solvent extraction 196 in the manner previously described in extraction step 181. Barren leach liquor 197 may be recycled to the leach step of the process. Cobalt-loaded extractant stream 198 is stripped of its cobalt content in means 199 with recycle of barren extractant stream 200 to the solvent extraction step. As in extraction step 181, $\alpha$-hydroxy oximes are preferred as the extracting agent since these materials display a high degree of selectivity toward divalent cobalt. Acid stripping solution 201 is then processed in electrowinning cell 202 to recover metallic cobalt 203 as a cathode deposit while regenerating acid stripping medium 204.

The following examples serve to more fully illustrate specific embodiments of our process and its various component steps.

EXAMPLE 1

A large sample of laterite ore was obtained from the Pine Flat deposit which is located in northern California and southern oregon. The sample was a typical laterite consisting primarily of limonite with lesser amounts of serpentine, altered olivine, a wad-like manganese oxide, and chromite. Petrographic and microprobe analysis of the material indicated that about 23% of the contained nickel and essentially all of the cobalt were in the manganese oxide while the remainder of the nickel was uniformly distributed in the laterite. The wad contained 28% manganese and 13% each of nickel and cobalt. The ore was screened at about 5 cm to remove the coarse fraction which was chiefly serpentine containing only 0.3 to 0.4% nickel. The remainder was then crushed to minus 6.35 mm, split and sampled. A chemical analysis of a representative portion contained in weight %: Ni, 0.97; Co, 0.2; Fe 36.1; Mn, 0.5; Cr, 1.87, MgO, 7.22; $SiO_2$, 21.5; $Al_2O_3$, 4.11; and CaO, 0.08. Free moisture content of this sample was 21.3%. A size analysis of the sample showed that more than 25% passed a 325 mesh (44) sieve and that there was very little concentration of nickel or cobalt within any size fraction. The +8 mesh (2.36 mm) fraction consisted primarily of low-value serpentine.

In order to control dusting of the ore in subsequent processing steps, it was pelletized on a disc pelletizer, using only water as a binder, and thereafter dried at temperatures ranging from about 350° to 600°C. Within this temperature range, free moisture and limonitic water was driven off but essentially no decomposition of the silicates occurred. Dried pellets exhibited sufficient structural strength to be readily handled and processed in a tube kiln and a multiple hearth furnace without significant dusting. However, the pellets were not sufficiently strong to allow processing in a fluidizied bed or by similar techniques. The pellets were retained for further processing and testing.

EXAMPLE 2

A series of batch reduction tests were performed on the laterite pellets of Example 1. Reduction was carried out in a vertical tube furnace using carbon monoxide of minimum 99% purity as the sole reductant gas. The net reduction reaction was determined by differential thermal analysis to be slightly exothermic producing about 11 to 14 kcal/kg. Reaction was essentially complete within 40 minutes at a carbon monoxide flow rate of about 2 ml/min per g of ore charge.

After completion of the reduction, each charge was cooled in an inert atmosphere and the reduced metals were extracted by aqueous chlorination using chlorine gas sparged through an agitated slurry having a solids content of about 20% at temperatures of 80° to 90°C. The chlorination reaction was determined to be complete when the pH reached 1.8 to 2.0.

Figure 7:
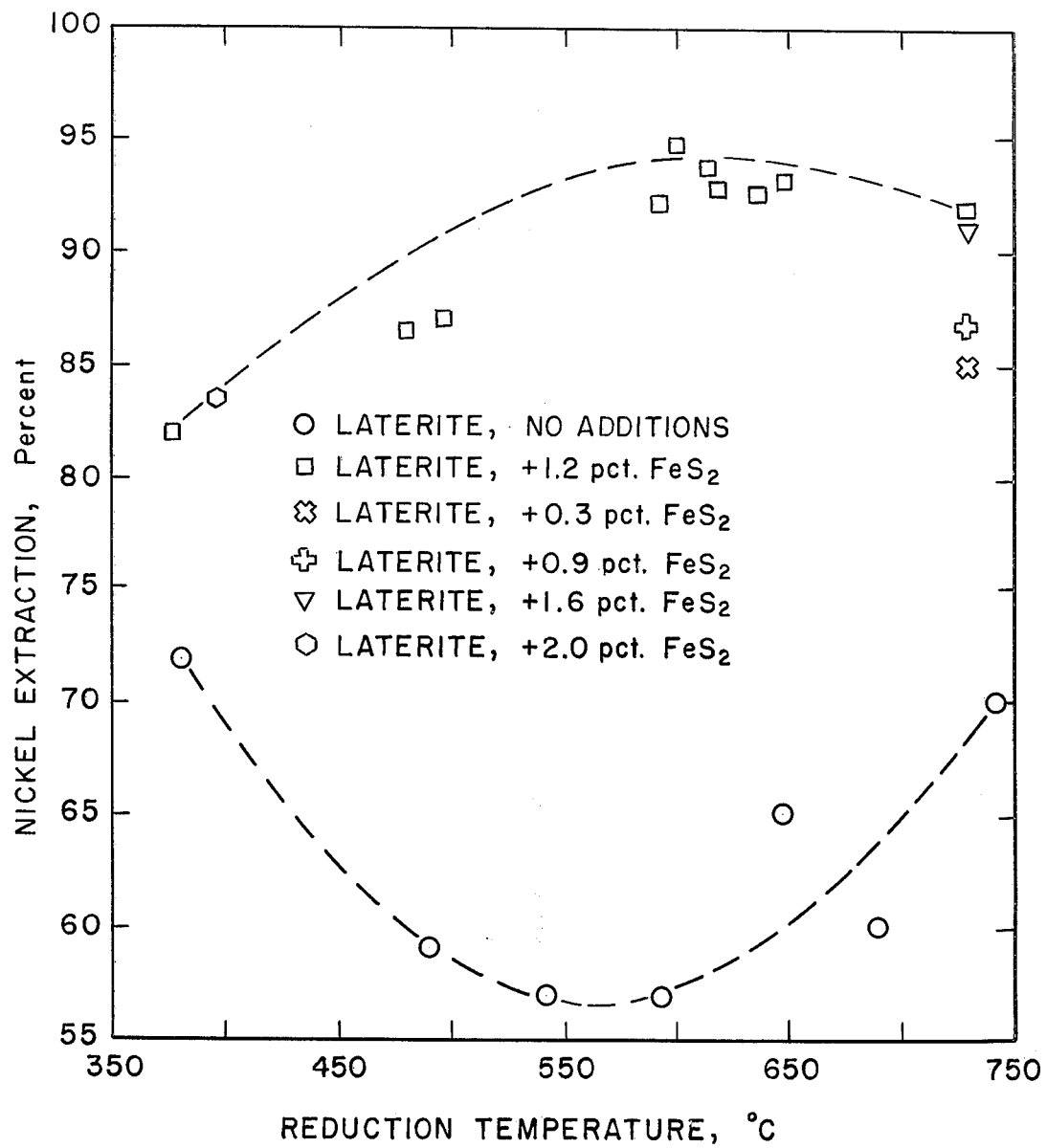
FIG. 7 illustrates the effect of pyrite additions on nickel extraction in the reduction of laterite ores at various temperatures.

Results of these tests are presented in FIG. 7. As is shown by the bottom curve, nickel extraction was relatively poor in these tests, reaching a minimum at temperatures of about 550° to 600°C. The effectiveness of pyrite in improving nickel extraction from hydrated nickel silicates had long ago been pointed out by Caron (Ammonia Leaching of Nickel and Cobalt Ore, Trans. AIME, V. 188, January 1950, pp. 67–90) and more recently by Brooks et al (Improving Nickel Extraction From Oxide Nickel Ores, U.S. Bureau of Mines TPR 57 1972, 4 pp. Pittsburgh. Pa.) for serpentine materials but neither publication offered an explanation of the mechanism involved. On the basis of this previous work, additional samples of the same literite ore but with incorporation of small amounts of pyrite, were reduced and subjected to aqueous chlorination in the manner previously described. Pyrite additions ranged from 0.3 to 2.0% over a temperature range of about 375° to 725°C. Results obtained follow the upper curve of FIG. 7. As may be seen from that curve, maximum nickel extraction (representing the degree of nickel reduction to the elemental state) occurred in the neighborhood of 600°C. Maximum nickel reduction to the elemental form obtained in these tests was 94.6% and maximum cobalt reduction was 94.3%. About 97% of the manganese was reduced while iron reduction ranged from 10–15% depending upon reduction temperature; an increase in temperature producing an increase in iron reduction. Less than 1% of the chromium present was reduced.

EXAMPLE 3

Figure 8:
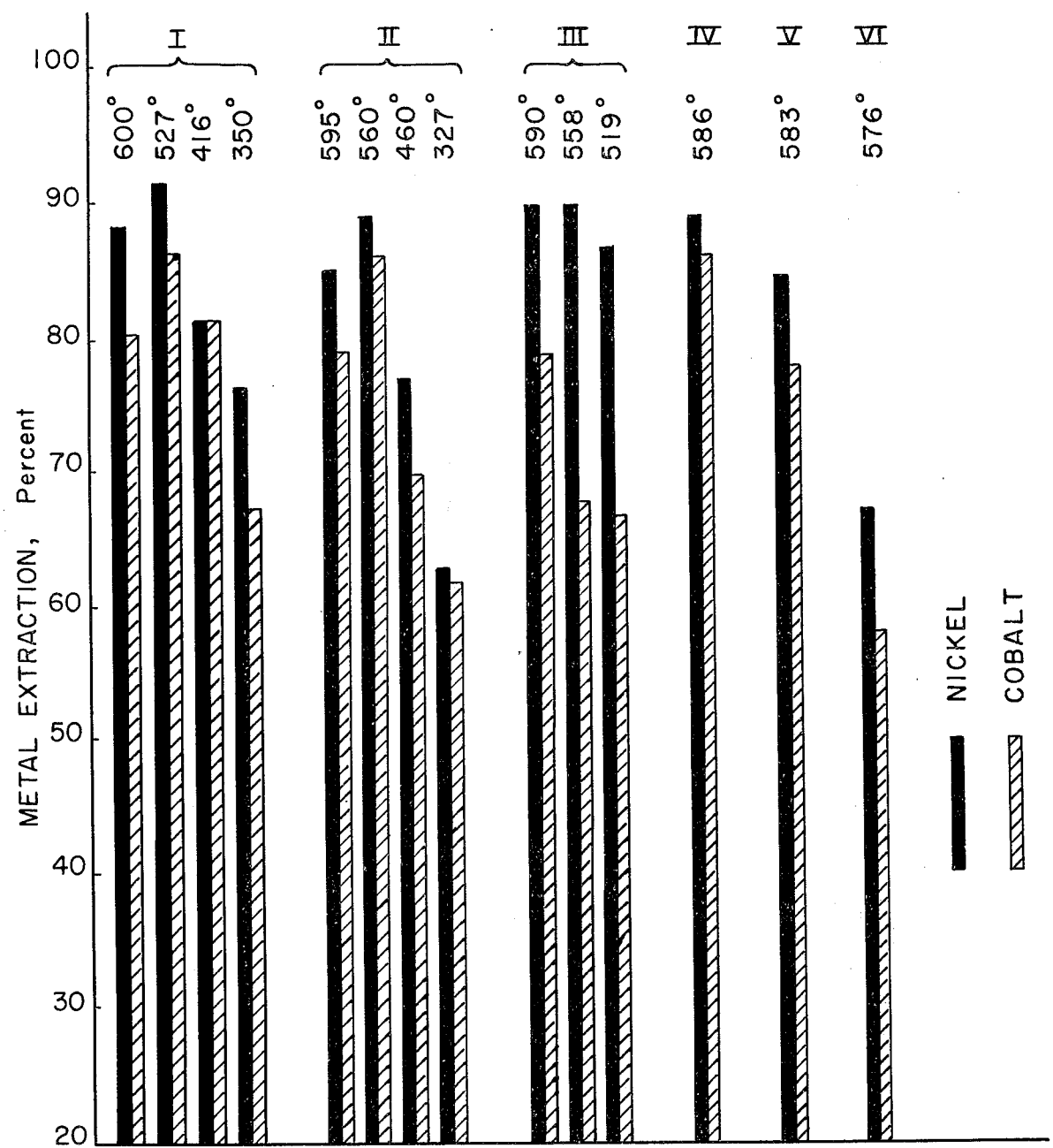
FIG. 8 depicts graphically results obtained in the selective reduction of Oregon laterite using carbon monoxide and various mixtures of reducing gases.

Samples of the Pine Flat laterite ore of Example 1, with the addition of 1.2% pyrite, were reduced at a number of different temperatures using a variety of reducing gas compositions. Except for varying temperature and reducing gas composition, reduction conditions were identical. The reduced ore was then extracted using an ammonia-ammonium sulfate leach and the nickel and cobalt recovery obtained in each case is plotted as FIG. 8.

Group I represents the results obtained using carbon monoxide of 99% + purity. Group II represents results obtained using a "rich" producer gas having the following composition: $H_2$, 19%, CO, 14%, $CO_2$, 3.5%; $N_2$, 63.5%. Group III represents results obtained using a gas composition referred to in the literature as a "blue" water gas having the following composition: $H_2$, 51.8%, CO, 43.1%, $CO_2$, 3.5%, $N_2$, 1.6%. Sample IV was reduced using the following gas composition: $H_2$, 10.5%, CO, 22.0%; $CO_2$, 5.7%, and $N_2$, 61.8%. This gas is typical of that of a producer gas from coal. Sample V was reduced with a gas of the following composition: $H_2$, 18.1%; CO, 7.1%, $CO_2$, 3.3%; and $N_2$, 71.4%. Sample VI was reduced using a gas having the composition: $H_2$, 5%; CO, 10%, $CO_2$, 10%; $N_2$, 75%.

As may be seen from the plotted data, use of pure carbon monoxide (Group I) as the reductant results in the overall highest extraction of nickel and cobalt over the greatest temperature range. Use of various mixtures of typical reducing gases containing hydrogen, carbon monoxide and carbon dioxide resulted in generally lower recoveries, especially of cobalt. Additionally, the recovery of both nickel and cobalt was much more sensitive to reduction temperature using mixtures of gaseous reducing agents than with carbon monoxide and the results obtained varied with the relative proportions of hydrogen, carbon monoxide and carbon dioxide in the reducing gas.

EXAMPLE 4

Figure 9:
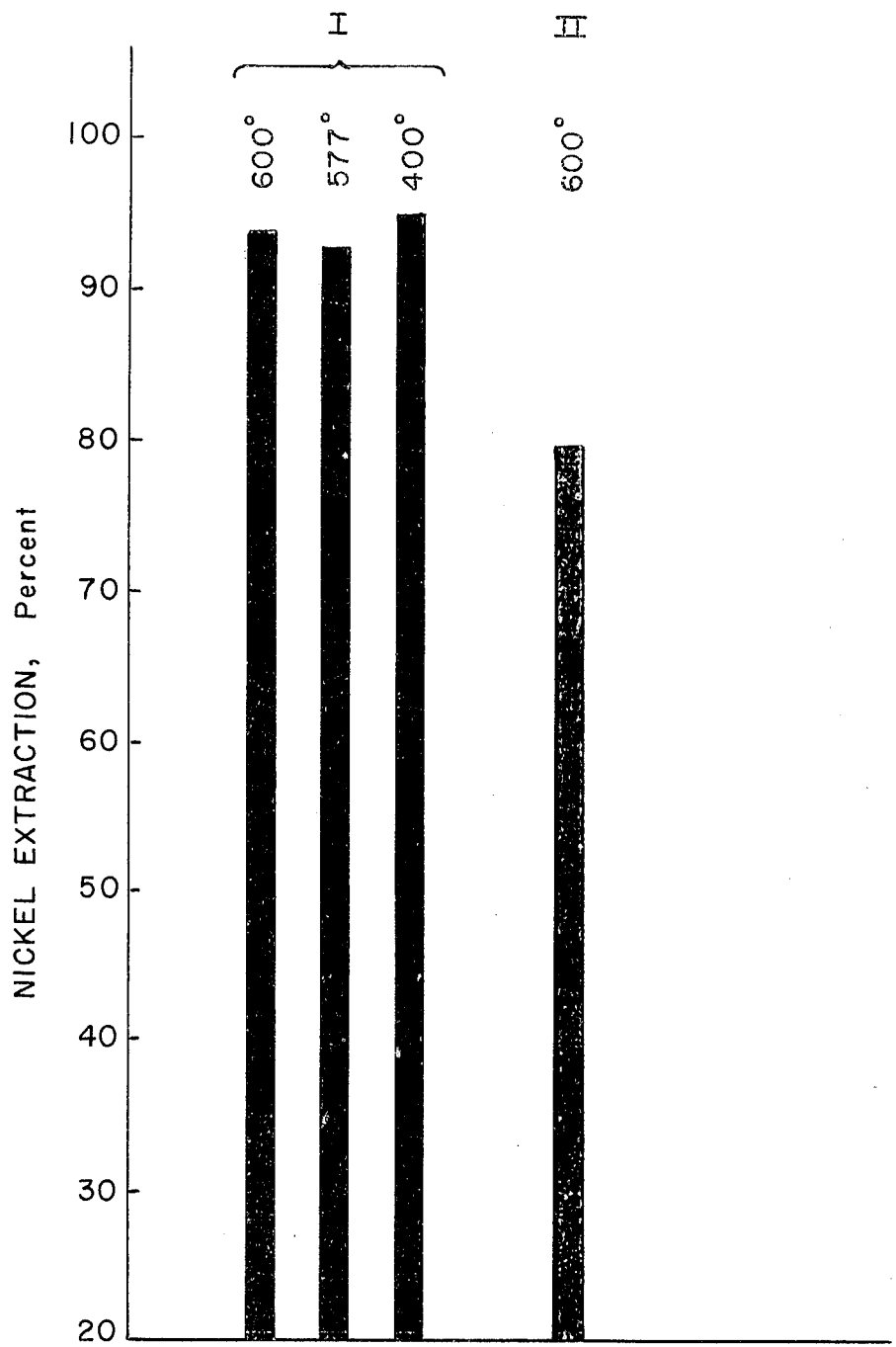
FIG. 9 depicts results obtained in the selective reduction of Phillipine laterite.

A sample of laterite ore obtained from a deposit in the Phillipines was analyzed and found to contain 1.15% nickel, 1.25% magnesium oxide and 47% iron. Samples of this ore were reduced in the manner previously described for Pine Flat laterite except that no pyrite was added to the ore. Nickel was leached from the reduced ore using an oxidizing ammonia-ammonium sulfate leach and the results of these tests are presented as FIG. 9.

In that Figure, Group I samples were reduced using essentially pure carbon monoxide as the sole reductant. Nickel extraction varied from 93 to 95% over the reduction temperature range of 400° to 600°C. In comparison, sample II was reduced using the same rich producer gas as was used to reduce Pine Flat laterite samples of Group II, FIG. 8. Nickel extraction was only 80% at a 600°C reduction temperature.

EXAMPLE 5

The relationship between nickel recovery as a function of magnesia content of laterite ores and pyrite addition to those ores prior to reduction was further investigated. It was found that addition of 2% pyrite to a southern Oregon laterite ore (0.75% nickel, 6.6% magnesia, and 33% iron) resulted in an 8.75% increase in nickel extraction; that addition of 1.5% pyrite to saprolite (1.3% nickel, 28% magnesia, and 13% iron) resulted in a 250% increase in nickel extraction); that addition of up to 10% pyrite to serpentine (0.47% nickel, 41% magnesia, and 6% iron) resulted in a 230% increase in nickel extraction. Further experiments showed that pyrite addition had no effect on nickel extraction from the Phillipine laterite ore of Example 4 which contained only 1.25% magnesia.

An additional experiment showed that nickel extractions as high as about 89% could be obtained without pyrite addition to a laterite ore essentially identical in analysis to the Pine Flat laterite of Example 1 but containing about 2% less magnesia. Substitution of hydrogen sulfide for pyrite gave similar results.

These experiments suggest that, with a magnesia content sufficiently high at a given reduction temperature, reduced nickel may be involved in a secondary reaction with magnesium and silicon that renders it inert in the subsequent leach. Sulfur from the pyrite apparently impedes this secondary reaction.

EXAMPLE 6

Figure 10:
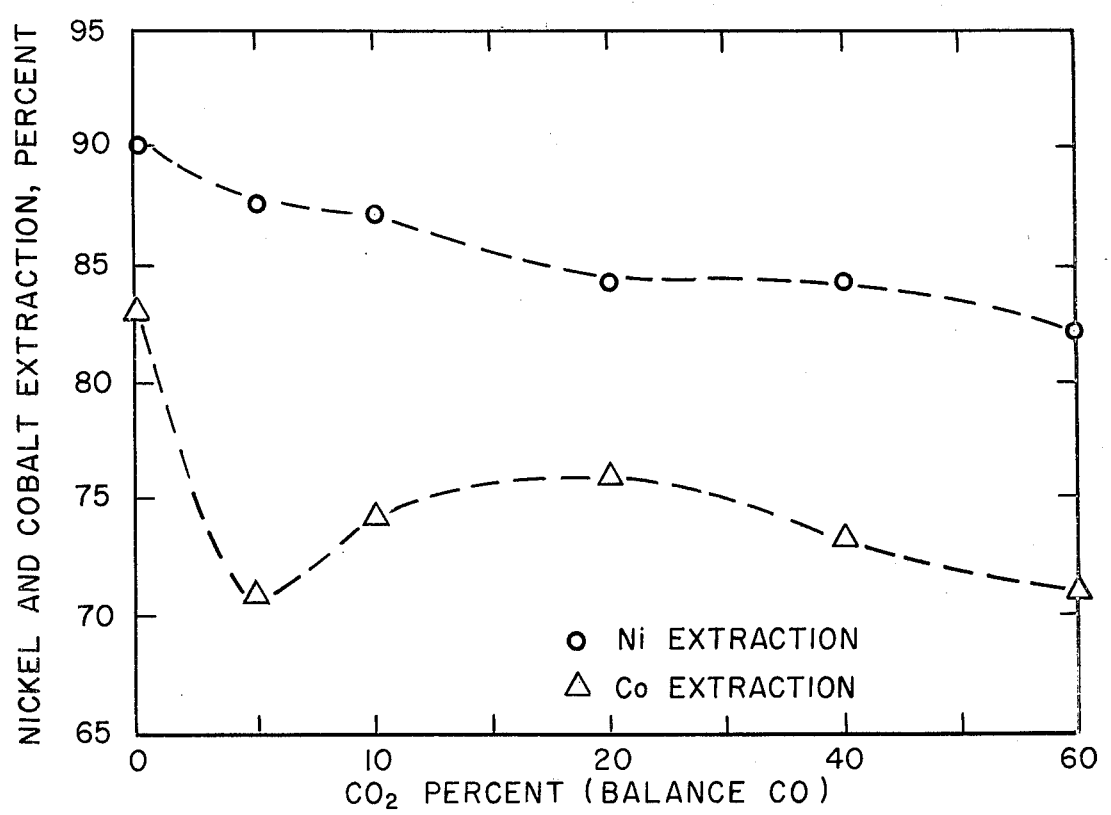
FIG. 10 illustrates the effect of carbon dioxide as a constituent of the reducing gas on nickel and cobalt extraction.

The effect of carbon dioxide as a diluent in carbon monoxide on the recovery of nickel and cobalt from the Pine Flat laterite of Example 1 was investigated. All reductions were carried out at a temperature of 530°C with a pyrite addition of 1.2%. Reduced ore was cooled under an inert atmosphere and nickel and cobalt were extracted using an axidizing ammonia-ammonium sulfate leach. Results of the tests are plotted as FIG. 10. As may be seen from this plot, nickel recovery tends, generally downward as carbon dioxide content of the reducing gas increases while cobalt recovery is more adversely affected. Similar results were obtained for reduction temperatures both lower and higher than that illustrated.

EXAMPLE 7

A sample of the Pine Flat laterite ore of Example 1 was mixed with 1.2% of pyrite and reduced at 527°C using pure carbon monoxide as the reductant. The reduced ore was cooled under an inert atmosphere and was then introduced into a leach solution contained in a closed vessel equipped with agitation means and sparging means for the introduction of gaseous oxygen. The leach solution contained 56 gpl ammonia and 300 gpl ammonium sulfate and the solids content was approximately 20%.

Oxygen was then introduced into the agitated slurry of leach solution and ore at a rate of 0.5 l/min per kg ore for a period of 25 minutes. Total oxygen introduced during this period was equivalent to more than 500% of that theoretically required to oxidize nickel to the divalent state and cobalt to the trivalent state. However, the total oxygen introduced during this period was slightly less than that theoretically required to oxidize all of the iron to the divalent state.

During this period of oxygen introduction, there was no rise in pressure within the leach vessel but the leach solution did increase in temperature a few degrees Centigrade due to the exothermic nature of the oxidation reaction. Rate of oxygen introduction into the leach vessel was then increased 8-fold, to a rate of 4 l/min per kg ore for an additional 15 minutes. This higher oxygen rate was greater than that at which the ore slurry could react with the oxygen and excess oxygen was bled from the leach vessel through a pressure relief means. During the time in which oxygen was introduced in excess, the ferroous iron was oxidized in solution to the ferric state causing its precipitation as the hydroxide.

The ore slurry was separated from the leach solution by filtration, washed with ammonium hydroxide and washed again with water. Analysis of the leached ore showed a nickel content of 0.09% and a cobalt content of 0.03% corresponding to a nickel recovery of about 92% and a cobalt recovery of about 87%.

EXAMPLE 8

A sample of the Pine Flat laterite ore of Example 1 was mixed with 1.2% pyrite and reduced at a temperature of 500°–550°C using pure carbon monoxide as the reductant. The ore was cooled in an inert atmosphere and slurried with sufficient leach solution to give a solids content of about 20%. The ore and leach solution, which contained about 42 gpl ammonia and 150 gpl ammonium sulfate, was then subjected to an oxidizing leach in a closed, agitated vessel for 15 minutes at ambient temperature. Pure oxygen was introduce into the vessel at a flow rate of 0.5 l/min per kg ore.

At the end of this leach period, ore was separated from the solution by filtration and the filtrate was found to contain about 1.4 gpl nickel and about 0.25 gpl cobalt. The ore was then repulped in additional leach solution of the same composition and subjected to a second 15 minute leach at the same oxygen rate. At the end of the second leach stage, the ore was separated by filtration; repulped in fresh leach solution and subjected to an additional 15 minute leach at the same oxygen flow rate used previously. Ore was again separated from leach solution by filtration, washed with ammonium hydroxide and washed again with water. Total nickel extraction in the three leach stages exceeded 90% while total cobalt extraction exceeded 85%.

EXAMPLE 9

Leach solutions containing nickel and cobalt in solution, such as those obtained by the leaching of laterite ores illustrated in Examples 7 and 8, were subjected to a liquid solvent extraction using a multiple-stage, countercurrent mixer-settler unit. The extracting agent comprised an α-hydroxy oxime, sold under the designation LIX-64N by General Mills, Inc., dissolved in a kerosene-type hydrocarbon solvent. Up to 98% of the nickel and 1% or less of the cobalt were extracted from dilute (0.45 gpl Ni, 0.12 gpl Co) leach liquors. Nickel was then effectively completely stripped from the loaded organic phase in three stages with a solution containing only 1.5 gpl sulfuric acid.

The nickel-barren raffinate was then sparged with hydrogen sulfide which precipitated essentially all of the cobalt as the sulfide. After separation of the precipitated cobalt sulfide, the leach liquor was recycled and reused in the extraction of nickel and cobalt from reduced laterite ores.

EXAMPLE 10

The nickel-containing sulfuric acid stripping solution from Example 9, having a pH of about 3.9, was electrolyzed in a diaphram-type electrowinning cell. Metallic nickel was deposited on the cathode at a current efficiency of about 99%. The barren electrolyte comprised dilute sulfuric acid suitable for re-use as a stripping agent for the nickel-loaded organic extractant.

EXAMPLE 11

Chalcopyrite concentrates were dead roasted and then subjected to a selective reduction at 550°C using pure carbon monoxide as the reductant. The cooled reduced ore was subjected to an oxidizing ammonia-ammonium sulfate leach, as described in Example 8. Approximately 99% of the copper contained in the concentrate was recovered in the leach solution. Copper concentration in the filtrate from the first stage leach was approxmately 22 gpl.

EXAMPLE 12

A flotation concentrate obtained by treating tailings from the Blackbird Mine, Idaho, was analyzed with the following results: copper, 2.86%; cobalt, 2.10%; iron, 35.5%; arsenic, 2.8%; magnesium, 0.24%; and nickel, 0.16%. The concentrate, comprising mostly metal sulfides, was dead roasted and then subjected to a selective reduction at about 500°C using pure carbon monoxide as the reductant.

The cooled, reduced concentrate was then subjected to an oxidizing ammonia-ammonium sulfate leach as described in Example 8. Analysis of the leach solution and residue indicated that 89% of the nickel, 87% of the cobalt and 92% of the copper contained in the ore concentrate was extracted into the leach solution.

EXAMPLE 13

A sample of Pacific Ocean manganese nodules was obtained and an analysis performed with the following results: manganese, 21.4% nickel, 0.79%; copper, 0.34%; cobalt, 0.12%; iron, 11.9%; silica, 16.8%; alumina, 10.6%; magnesium oxide, 1.7%; and calcium oxide, 0.9%. The nodules were reduced at a temperature of about 345°C using pure carbon monoxide as the reductant. This reaction was highly exothermic, probably because of the high manganese content, and so the reduction had to be performed slowly.

Reduced nodules were then subjected to an oxidizing ammonia-ammonium sulfate leach in the manner of Example 8 using a leach solution containing 75 gpl ammonia and 150 gpl ammonium sulfate. Approximately 88% of the copper, 74% of the nickel and 21% of the cobalt content of the nodules were recovered in the leach solution.

EXAMPLE 14

Off-gas from the carbon monoxide reduction of laterite ore, comprising a mixture of carbon monoxide and carbon dioxide, was passed through a coke bed held at a temperature of 1070° to 1100°C. After passing through the coke bed, the product gas analyzed more than 99% carbon monoxide and was suitable for use as a reductant in the process.

EXAMPLE 15

Solid residue of Pine Flat laterite ore, after being treated as in Examples 7 and 8, was subjected to a wet magnetic separation. An iron oxide concentrate and a gangue residue, comprising the oxides of silicon, magnesium and aluminum, were obtained. The iron oxide concentrate analyzed 66% iron and was found to be equivalent to a high grade iron ore for steel making purposes.

We claim:

1. A process for the recovery of nickel from laterite ores which comprises:
  comminuting said laterite ore to a finely divided state;
  pelletizing said comminuted ore;
  drying the pelletized ore at a temperature sufficiently high to drive off all free moisture and limonitic water but at a temperature sufficiently low so as not to drive off chemically combined silicate water;
  contacting the dried ore with a reductant gas consisting essentially of carbon monoxide at a temperature in the range of 350° to 600°C for a time sufficient to reduce substantially all nickel oxide contained in the ore to elemental metal;
  cooling the reduced ore to a temperature below about 200°C in an oxygen and water-free environment;
  mixing said cooled ore with a leach solution comprising an aqueous ammonia-ammonium sulfate solution, said mixing being coupled with attrition sufficiently intense to disintegrate the ore pellets and to form a suspension of reduced ore in the leach solution;
  contacting said suspension with gaseous oxygen for a time sufficient to oxidize substantially all of the elemental nickel contained in the reduced ore and to stabilize the oxidized nickel in the leach solution as its divalent ammine complex;
  separating the nickel containing leach solution from the ore residue; and
  recovering nickel values from said leach solution.

2. The process of claim 1 wherein said leach solution contains from about 25 to 150 gpl ammonia and from about 50 to 400 gpl ammonium sulfate.

3. The process of claim 2 wherein the binding agent in said pelletizing step is water.

4. The process of claim 2 wherein said gaseous oxygen is substantially free of impurities.

5. The process of claim 4 wherein said step of contacting the suspension of reduced ore and leach solution is carried out at temperatures in the range of 5° to 50°C.

6. The process of claim 5 wherein said laterite ore also contains cobalt and wherein said cobalt is oxidized to the trivalent state and stabilized in the leach solution as its amine complex.

7. The process of claim 6 wherein the concentration of ammonium sulfate in said leach solution is at least double that of ammonia and wherein the sum of the concentrations of ammonium sulfate and ammonia exceeds 200 gpl.

8. The process of claim 7 wherein nickel is selectively recovered from the nickel and cobalt-containing leach solution by solvent extraction.

9. The process of claim 8 wherein the extractant used in said solvent extraction is an $\alpha$-hydroxy oxime dissolved in a hydrocarbon solvent.

10. The process of claim 5 wherein the dried ore is contacted with carbon monoxide in multiple stages with carbon monoxide being passed in counterflow relationship to the ore.

11. The process of claim 10 wherein the drying temperature of the pelletized ore is essentially the same as the temperature at which dried ore is contacted with carbon monoxide.

12. The process of claim 11 wherein said drying temperature and said contacting temperature are in the range of 450° to 550°C.

13. The process of claim 10 wherein reactant gases produced by the contacting of dried ore with carbon monoxide are passed through a coke bed maintained at a temperature above about 1050°C to produce a carbon monoxide stream suitable for use in reducing additional ore.

14. The process of claim 13 wherein said carbon monoxide stream produced by reaction with coke has a purity greater than 99%.

15. The process of claim 10 wherein said laterite ore contains more that about 5% magnesia and wherein pyrite in an amount greater than 0.5% by weight of said ore is mixed with said ore prior to contacting the ore with carbon monoxide.

16. The process of claim 15 wherein said laterite ore is limonitic and wherein pyrite addition is in the range of 0.5 to 2.5% by weight of said ore.

17. The process of claim 15 wherein said laterite ore is serpentine and wherein pyrite is added in an amount greater than 0.5% but less than 10% by weight of said ore.

18. The process of claim 1 wherein said ore residue is subjected to a magnetic separation to recover an iron oxide concentrate suitable for use as an iron ore.

19. The process of claim 18 wherein said magnetic separation is a high intensity, wet magnetic separation.

20. A process for the selective reduction of non-ferrous metals associated with iron in an oxide ore, said non-ferrous metals selected from the group consisting of nickel, cobalt, copper mixtures thereof, which comprises:
  contacting said ore with a reducing gas consisting essentially of carbon monoxide at a temperature in the range of 350° to 600°C for a time sufficient to reduce substantially all of said non-ferrous metals to the elemental state, said contacting being performed in the absence of water vapor;

removing said ore from contact with the reducing gas before substantial reduction of iron oxides to metallic iron occurs; and cooling said reduced ore to a temperature below about 200°C in an inert atmosphere prior to performing any subsequent processing steps.

21. The process of claim 20 wherein said reduced ore, after being cooled below about 200°C, is slurried in an aqueous ammonia-ammonium salt leach solution and is thereafter contacted with gaseous oxygen for a time sufficient to oxidize substantially all of the non-ferrous metals and stabilize them in solution as their amine complexes.

22. The process of claim 21 wherein the ammonium salt is ammonium sulfate.

23. The process of claim 22 wherein said leach solution contains from about 25 to 150 g/l ammonia and from about 50 to 400 g/l ammonium sulfate.

24. The process of claim 23 wherein said reduced ore slurried in leach solution is contacted with substantially pure gaseous oxygen at a temperature in the range of 5° to 50°C at substantially atmosphperic pressure.

25. The process of claim 24 wherein said oxide ore is selected from the group consisting of the naturally occurring oxide ores of nickel, cobalt and copper.

26. The process of claim 25 wherein said oxide ore is a nickel-containing laterite.

27. The process of claim 25 wherein said oxide ore contains copper and is selected from the group consisting of chrysocolla azurite and malachite.

28. The process of claim 25 wherein said oxide ore is an ocean floor nodule.

29. The process of claim 24 wherein said oxide ore comprises a dead roasted calcine of a sulfide ore.

30. A process for recoverying non-ferrous metal values from a reduced ore containing iron in elemental form and at least one other elemental metal selected from the group consisting of nickel, cobalt and copper, which comprises:

forming a suspension of said reduced ore in an aqueous leach solution containing 25 to 150 gpl ammonia and 50 to 400 gpl ammonium sulfate;

contacting said suspension of reduced ore and leach solution with gaseous oxygen at a temperature in the range of 5° to 50°C;

maintaining the rate of oxygen introduction in said contacting step at a level below 50% of the maximum rate at which oxygen can react with the reduced ore until at least 90% of the reduced non-ferrous metals are oxidized and stabilized within the leach solution as their ammine complexes;

thereafter, continuing oxygen introduction until substantially all of the reduced iron is oxidized to the ferric state and is precipitated as a hydrous ferric oxide; and separating leach solution, now containing non-ferrous metals, from the ore residue.

31. The process of claim 30 wherein said gaseous oxygen is essentially free of impurities.

32. The process of claim 31 wherein the oxygen is introduced as a dispersion of fine bubbles at a point near the bottom of said suspension.

33. The process of claim 31 wherein said contacting is accomplished in at least two stages and wherein at least 90% of the reduced non-ferrous metals are oxidized and stabilized within the leach solution as their ammine complexes in the first stage of said contacting.

34. The process of claim 33 wherein leach solution is separated from the ore at the conclusion of the first stage of said contacting and wherein the ore is re-suspended in fresh leach solution and is again contacted with gaseous oxygen in a second stage.

35. The process of claim 34 wherein the rate of oxygen introduction in said first stage is less than 25% of the maximum rate at which oxygen can react with the reduced ore.

36. The process of claim 34 wherein the rate of oxygen introduction in said second stage is equal to or greater than the maximum rate at which oxygen can react with the reduced ore.

37. The process of claim 34 wherein leach solution separated from the ore at the conclusion of said first stage contacting is contacted with oxygen for a time sufficient to oxidize soluble ferrous iron contained in the leach solution to the ferric state thereby precipitating said iron as a hydrous ferric oxide.

38. The process of claim 34 wherein leach solution is separated from the ore residue at the conclusion of said second stage contacting and wherein said ore residue is first washed with aqueous ammonium hydroxide, then with water and is thereafter subjected to a magnetic separation to recover an iron oxide concentrate suitable for use as an iron ore.

39. The process of claim 31 wherein said reduced ore is a nickel-containing laterite.

* * * * *